UNITED STATES PATENT OFFICE.

HENRY H. BEACH, OF ROME, NEW YORK.

IMPROVEMENT IN PROCESSES FOR MANUFACTURING HORSE-FEED.

Specification forming part of Letters Patent No. 172,863, dated February 1, 1876; application filed July 3, 1875.

*To all whom it may concern:*

Be it known that I, HENRY H. BEACH, of Rome, Oneida county, State of New York, have invented an Improved Process for Manufacturing Feed for Cattle and Horses, from corn and other grain, of which the following is a specification:

My invention relates to the manufacture of feed from corn and other grain; and consists of the peculiar process or method hereinafter described.

My new process of manufacturing feed from corn and other grain consists in submitting grain to the action of hot vapor in a suitable vessel or vat until the temperature of the grain is raised to that of the vapor, whereby its vitality is destroyed, and its contained water is converted into vapor, and then grinding or crushing the grain while still hot and moist.

In performing my process I provide a suitable vat, which will hold some twenty bushels or more of grain, which vat is supplied with a number of perforated pipes connected with a steam-generator, the pipes being so disposed that steam may be introduced through them into and diffused through the contents of the vat when containing grain. Into this vat I put a quantity of grain, and then let on steam from the generator into and through the perforated pipes.

The steam should preferably be under considerable pressure in the generator, in order that the vapor in the vat shall have a temperature of 212° Fahrenheit.

In from five to ten minutes the grain will have the temperature of the vapor; but to produce the desired effect of the steaming the operation should be continued from twenty to thirty minutes longer, in order that all the contained water of the grain shall be converted into vapor, and be thereby in great measure expelled, and also that starch contained in the grain shall be converted into sugar; in other words, until the grain is thoroughly cooked.

The next step in my process is the grinding or crushing of the grain. This is done while the grain is still hot, soft, and moist. To effect this the grain may be transferred immediately from the vat to the grinding-mill or crusher, which may be a common run of burr-stones, through a close conductor, the introduction of the steam into the vat being continued during the grinding or crushing. As the steamed grain is drawn off at the bottom of the vat to the mill or crusher, fresh grain may be kept running in at the top of the vat, and thus the operation of steaming and grinding or crushing be carried on simultaneously and continuously.

The kernels of the grain being hot when ground or crushed, their contained moisture is quickly and easily evaporated by exposure of the ground or crushed feed to the air.

The distinguishing novelty of my new process or method of manufacturing feed from grain is the heating of the grain in moist heat until its vitality is destroyed, and its contained water is converted into vapor, and then, while it is still hot and moist, grinding or crushing it into feed.

The advantages of this new method or process are, that there is by it produced a new kind of feed, possessing qualities that make it superior to any feed heretofore made, being more digestible, wholesome, and nutritious, more easily masticated, less liable to sour or ferment, and which is better able to endure the action of all atmospheric and climatic changes.

The product of this process is not claimed in this specification, the same being reserved for a separate application and patent.

I claim—

The improvement in the art of manufacturing feed from grain herein described, consisting in cooking the grain by moist heat, and then grinding or crushing it while it is still hot and moist, as and for the purpose specified.

In witness whereof I have hereunto set my hand this 1st day of July, 1875.

HENRY H. BEACH.

Witnesses:
W. H. SMITH,
A. S. FITCH.